(12) United States Patent
Lokhande et al.

(10) Patent No.: US 11,739,677 B1
(45) Date of Patent: Aug. 29, 2023

(54) BAFFLE FOR AN EXHAUST GAS PRESSURE SENSOR ASSEMBLY

(71) Applicant: DEERE & COMPANY, Moline, IL (US)

(72) Inventors: Mahesh B. Lokhande, Pune (IN); Paul M. Wynthein, Waterloo, IA (US); Timothy P. Slattery, Hudson, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/806,840

(22) Filed: Jun. 14, 2022

(51) Int. Cl.
*G01L 7/00* (2006.01)
*G01L 7/08* (2006.01)
(Continued)

(52) U.S. Cl.
CPC ........... *F01N 13/008* (2013.01); *F01N 13/10* (2013.01); *G01L 7/00* (2013.01); *G01L 7/08* (2013.01); *F01N 2560/08* (2013.01)

(58) Field of Classification Search
CPC ...... F01N 9/002; F01N 2560/08; F01N 3/035; F01N 3/021; F01N 11/002; F01N 13/0097; F01N 13/009; F01N 2560/06; F01N 3/023; F01N 2610/02; F01N 13/1805; F01N 3/2066; F01N 2590/08; F01N 13/008; F01N 11/00; F01N 2900/1406; F01N 9/00; F01N 3/106; F01N 3/103; F01N 13/1855; F01N 2550/04; F01N 3/0842; F01N 2900/1404; F01N 2900/1606; F01N 3/0253; F01N 2470/18; F01N 2560/14; F01N 3/208; F01N 13/10; F01N 3/02; F01N 2900/1602; F01N 3/0211; F01N 2240/36; F01N 3/0231; F01N 2900/08; F01N 2560/026; F01N 2570/14; F01N 2250/02; F01N 13/0093; F01N 2610/03; F01N 2340/04; F01N 3/28; F01N 9/005; F01N 3/0821; F01N 2450/30; F01N 2900/0416; F01N 3/027; F01N 13/08; F01N 3/025; F01N 3/0814; F01N 3/0235; F01N 3/0335; F01N 2560/05; F01N 2560/025; F01N 2900/1402; F01N 2430/06; F01N 2900/0422; F01N 13/18; F01N 2900/1411; F01N 13/011; F01N 2610/14; F01N 3/20; F01N 2610/146; F01N 3/36; F01N 2900/0601; F01N 5/02; F01N 3/24; F01N 13/1822; F01N 2410/00; F01N 11/007; F01N 3/00; F01N 2610/1453; F01N 2260/14; F01N 2450/24; F01N 2340/02; F01N 2470/02; F01N 3/2006; F01N 11/005; F01N 3/2033; F01N 2240/20;
(Continued)

(56) References Cited

U.S. PATENT DOCUMENTS

2008/0110273 A1   5/2008   Saito et al.

*Primary Examiner* — Andre J Allen

(57) ABSTRACT

A baffle of an exhaust gas pressure sensor assembly is disposed at an exhaust manifold of an internal combustion engine and includes an exhaust gas pressure sensor configured to sense a pressure of exhaust gas at the exhaust manifold. The baffle includes a conduit, a plate disposed within the conduit separating the exhaust gas volume into a first portion and a second portion, and a plurality of apertures disposed through the plate and configured to provide fluid communication of the exhaust gas between the first portion of the exhaust gas volume and the second portion of the exhaust gas volume such that each of the plurality of apertures is centered radially outside of an inner passageway to a diaphragm of the exhaust gas pressure sensor.

16 Claims, 2 Drawing Sheets

(51) Int. Cl.
  *F01N 13/00* (2010.01)
  *F01N 13/10* (2010.01)
(58) Field of Classification Search
  CPC ...... F01N 13/1894; F01N 3/10; F01N 3/0871; F01N 3/101; F01N 2240/02; F01N 2430/085; F01N 2550/02; F01N 2330/06; F01N 2900/12; F01N 3/005; F01N 3/18; F01N 2430/00; F01N 3/0222; F01N 13/00; F01N 2550/05; F01N 3/032; F01N 2240/14; F01N 3/08; F01N 2240/16; F01N 2260/04; F01N 2900/1808; F01N 2560/02; F01N 2560/07; F01N 2610/08; F01N 3/30; F01N 3/0885; F01N 2570/12; F01N 3/2053; F01N 5/04; F01N 2430/08; F01N 2570/04; F01N 2610/10; F01N 2610/1406; F01N 2550/00; F01N 3/22; F01N 3/2892; F01N 2250/14; F01N 3/206; F01N 2590/10; F01N 2900/0408; F01N 2250/12; F01N 2260/20; F01N 2570/10; F01N 2610/06; F01N 13/082; F01N 3/031; F01N 2260/022; F01N 2260/024; F01N 2470/24; F01N 2900/0412; F01N 2560/021; F01N 3/2073; F01N 3/0226; F01N 2900/0418; F01N 2240/38; F01N 2560/12; F01N 3/2839; F01N 3/2842; F01N 13/1844; F01N 3/2013; F01N 2490/04; F01N 3/0233; F01N 3/055; F01N 1/08; F01N 13/14; F01N 13/1838; F01N 2330/10; F01N 2900/10; F01N 3/033; F01N 3/2882; F01N 3/2885; F01N 13/16; F01N 13/1827; F01N 2570/16; F01N 3/0835; F01N 13/141; F01N 2230/02; F01N 2240/30; F01N 2550/14; F01N 3/0205; F01N 3/0238; F01N 3/222; F01N 2610/1493; F01N 3/32; F01N 9/007; F01N 2610/148; F01N 3/0256; F01N 3/0878; F01N 1/089; F01N 2470/08; F01N 2590/04; F01N 2900/0402; F01N 2900/1806; F01N 2330/08; F01N 2390/02; F01N 2550/03; F01N 2900/1621; F01N 3/029; F01N 1/00; F01N 1/165; F01N 1/18; F01N 2410/04; F01N 2590/11; F01N 2900/14; F01N 3/0217; F01N 1/085; F01N 1/10; F01N 13/105; F01N 13/107; F01N 13/1888; F01N 2430/10; F01N 2470/22; F01N 3/2875; F01N 3/323; F01N 2240/28; F01N 2450/40; F01N 2510/06; F01N 2610/1433; F01N 2900/1612; F01N 3/022; F01N 3/2803; F01N 1/166; F01N 13/02; F01N 2470/30; F01N 2510/065; F01N 2610/085; F01N 2900/104; F01N 2900/16; F01N 2900/1811; F01N 3/0236; F01N 3/04; F01N 1/02; F01N 13/143; F01N 2550/24; F01N 2610/1473; F01N 2900/102; F01N 2900/1622; F01N 3/38; F01N 13/102; F01N 2240/22; F01N 2390/00; F01N 2430/02; F01N 2590/00; F01N 2590/02; F01N 2900/1611; F01N 2900/1616; F01N 2900/1812; F01N 3/0212; F01N 3/0237; F01N 3/0807; F01N 3/306; F01N 13/1866; F01N 2260/08; F01N 2330/12; F01N 2370/04; F01N 2370/24; F01N 2430/04; F01N 2450/00; F01N 2470/00; F01N 2470/14; F01N 2610/102; F01N 3/01; F01N 3/2026; F01N 3/2093; F01N 3/2828; F01N 13/001; F01N 13/087; F01N 13/1811; F01N 13/185; F01N 2340/06; F01N 2560/20; F01N 2610/144; F01N 2900/1624; F01N 2900/1631; F01N 2900/1814; F01N 3/0234; F01N 3/0275; F01N 3/085; F01N 3/105; F01N 3/26; F01N 3/2853; F01N 5/00; F01N 1/084; F01N 1/168; F01N 13/017; F01N 2210/04; F01N 2240/10; F01N 2240/25; F01N 2260/18; F01N 2260/26; F01N 2410/08; F01N 2560/00; F01N 2610/01; F01N 2610/105; F01N 2900/0421; F01N 2900/1626; F01N 2900/1824; F01N 3/043; F01N 3/05; F01N 3/2086; F01N 3/2889; F01N 1/065; F01N 13/085; F01N 2240/26; F01N 2330/38; F01N 2450/28; F01N 2490/08; F01N 2560/022; F01N 2560/028; F01N 2900/0404; F01N 2900/0602; F01N 2900/1818; F01N 2900/1821; F01N 2900/1822; F01N 2240/04; F01N 2270/00; F01N 2330/14; F01N 2410/03; F01N 2510/0684; F01N 2530/04; F01N 2550/12; F01N 2560/023; F01N 2610/04; F01N 2610/12; F01N 2900/0406; F01N 3/028; F01N 3/06; F01N 3/0892; F01N 3/2046; F01N 1/026; F01N 1/24; F01N 13/04; F01N 2330/22; F01N 2330/60; F01N 2370/02; F01N 2410/14; F01N 2450/02; F01N 2450/16; F01N 2470/10; F01N 2470/20; F01N 2560/027; F01N 2570/22; F01N 2590/021; F01N 2610/1446; F01N 2900/1804; F01N 3/0215; F01N 3/0218; F01N 3/038; F01N 3/0857; F01N 3/2821; F01N 3/303; F01N 3/34; F01N 5/025; F01N 1/003; F01N 1/14; F01N 13/1816; F01N 2240/05; F01N 2240/40; F01N 2250/04; F01N 2260/10; F01N 2260/12; F01N 2270/04; F01N 2270/10; F01N 2330/02; F01N 2410/06; F01N 2450/22; F01N 2470/12; F01N 2490/15; F01N 2570/18; F01N 2610/107; F01N 2610/1426; F01N 2900/04; F01N 2900/0411; F01N 2900/1628; F01N 3/0214; F01N 3/0232; F01N 3/0293; F01N 3/0864; F01N 3/225; F01N 3/281; F01N 1/16; F01N 13/002; F01N 13/12; F01N 13/1872; F01N 2230/04; F01N 2250/06; F01N 2260/02; F01N 2260/06; F01N 2260/24; F01N 2290/00; F01N 2330/00; F01N 2340/00; F01N 2370/22; F01N 2390/04; F01N 2410/02; F01N 2450/18; F01N 2510/08; F01N 2550/10; F01N 2550/20; F01N 2550/22; F01N 2610/00; F01N 2610/11; F01N 2610/1486; F01N 2900/00; F01N 2900/0414; F01N 2900/1614; F01N 2900/18; F01N 3/108; F01N 3/326; G01L 23/24; G01L 19/147; G01L 19/0627; G01L 13/00; G01L 19/04; G01L 9/0054; G01L 13/025; G01L 19/145; G01L 13/06;

G01L 19/0069; G01L 19/0084; G01L 19/0645; G01L 19/143; G01L 27/002; G01L 19/0681; G01L 19/141; G01L 23/225; G01L 27/007; G01L 9/0052; G01L 19/14; G01L 9/00; G01L 9/0051; G01L 19/0038; G01L 19/06; G01L 19/0609; G01L 19/0654; G01L 9/0042; G01L 15/00; G01L 27/00; G01L 19/02; G01L 23/08; G01L 27/005; G01L 1/16; G01L 1/18; G01L 19/00; G01L 19/0007; G01L 19/0092; G01L 19/142; G01L 3/00; G01L 9/06; G01L 23/18; G01L 23/26; G01L 23/28; G01L 7/00; G01L 13/04; G01L 19/003; G01L 19/0618; G01L 19/0636; G01L 19/0672; G01L 19/069; G01L 19/148; G01L 2019/0053; G01L 2023/228; G01L 23/10; G01L 23/22; G01L 23/227; G01L 9/0055; G01L 9/0072; G01L 9/0092; G01L 9/04; G01L 9/08; G01L 1/005; G01L 11/00; G01L 11/04; G01L 13/02; G01L 19/0046; G01L 23/16; G01L 5/14; G01L 7/086; G01L 9/0044; G01L 9/0048; G01L 9/02; G01L 9/065; G01L 9/125

See application file for complete search history.

BAFFLE FOR AN EXHAUST GAS PRESSURE SENSOR ASSEMBLY

BACKGROUND

Internal combustion engines generate exhaust gas from the combustion of fuel and air in combustion chambers of the internal combustion engine. The exhaust gas may travel away from the internal combustion engine through the exhaust manifold. A pressure line may be connected to the exhaust manifold and terminate at an exhaust gas pressure sensor in order to allow the exhaust gas pressure sensor to be exposed to the exhaust gas. The exhaust gas pressure sensor may be utilized to generate a signal indicating a pressure of the exhaust gas generated by the internal combustion engine in the exhaust manifold.

SUMMARY

According to an aspect of the present disclosure, a baffle of an exhaust gas pressure sensor assembly is disposed at an exhaust manifold of an internal combustion engine and includes an exhaust gas pressure sensor configured to sense a pressure of exhaust gas at the exhaust manifold. The baffle includes a conduit having a conduit axis and being configured to enclose an exhaust gas volume between the exhaust manifold and the exhaust gas pressure sensor of the exhaust gas pressure sensor assembly, a plate disposed within the conduit separating the exhaust gas volume into a first portion and a second portion and spaced from an end surface of the exhaust gas pressure sensor that is disposed at the second portion of the exhaust gas volume, and a plurality of apertures disposed through the plate and configured to provide fluid communication of the exhaust gas between the first portion of the exhaust gas volume and the second portion of the exhaust gas volume such that each of the plurality of apertures is centered radially outside of an inner passageway to a diaphragm of the exhaust gas pressure sensor.

The plate may include a central portion concentric with and axially spaced from the diaphragm of the exhaust gas pressure sensor. Each of the plurality of apertures may be centered radially outside of the central portion. Each of the plurality of apertures may be configured such that the exhaust gas communicated to the second portion of the exhaust gas volume impinges onto the end surface of the exhaust gas sensor of the exhaust gas pressure sensor assembly. The plurality of apertures may be configured as a circular array of apertures. The conduit may be configured to enclose the end surface of the exhaust gas sensor. The conduit may include a threaded portion configured to couple the baffle to the exhaust gas sensor. Each of the plurality of apertures may have an aperture diameter that is less than one-third of a conduit diameter of the conduit at the plate. Each of the plurality of apertures may have an aperture area that is greater than one-twentieth of a conduit area of the conduit at the plate.

According to an aspect of the present disclosure, an exhaust gas pressure sensor assembly is configured for positioning at an exhaust manifold of an internal combustion engine to sense a pressure of exhaust gas at the exhaust manifold. The assembly includes an exhaust gas pressure sensor having an inner passageway to a diaphragm disposed radially inside of an end surface of the exhaust gas pressure sensor and configured to receive a pressure of the exhaust gas, a conduit configured to enclose an exhaust gas volume between the exhaust manifold and the exhaust gas pressure sensor, a plate disposed within the conduit and configured to separate the exhaust gas volume into a first portion and a second portion spaced from the end surface of the exhaust gas pressure sensor that is disposed at the second portion of the exhaust gas volume, and a plurality of apertures disposed through the plate and configured to provide fluid communication of the exhaust gas between the first portion of the exhaust gas volume and the second portion of the exhaust gas volume such that each of the plurality of apertures is centered radially outside of the inner passageway to the diaphragm of the exhaust gas pressure sensor.

The plate may include a central portion concentric with and axially spaced from the diaphragm of the exhaust gas pressure sensor. Each of the plurality of apertures may be centered radially outside of the central portion. The exhaust gas communicated to the second portion of the exhaust gas volume may impinge onto the end surface of the exhaust gas sensor of the exhaust gas pressure sensor assembly. The plurality of apertures may be configured as a circular array of apertures. The conduit may be configured to enclose the end surface of the exhaust gas sensor. The conduit may include a threaded portion coupling the baffle to the exhaust gas sensor. Each of the plurality of apertures may have an aperture diameter that is less than one-third of a conduit diameter of the conduit at the plate. Each of the plurality of apertures may have an aperture diameter that is greater than one-tenth of a conduit diameter of the conduit at the plate.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
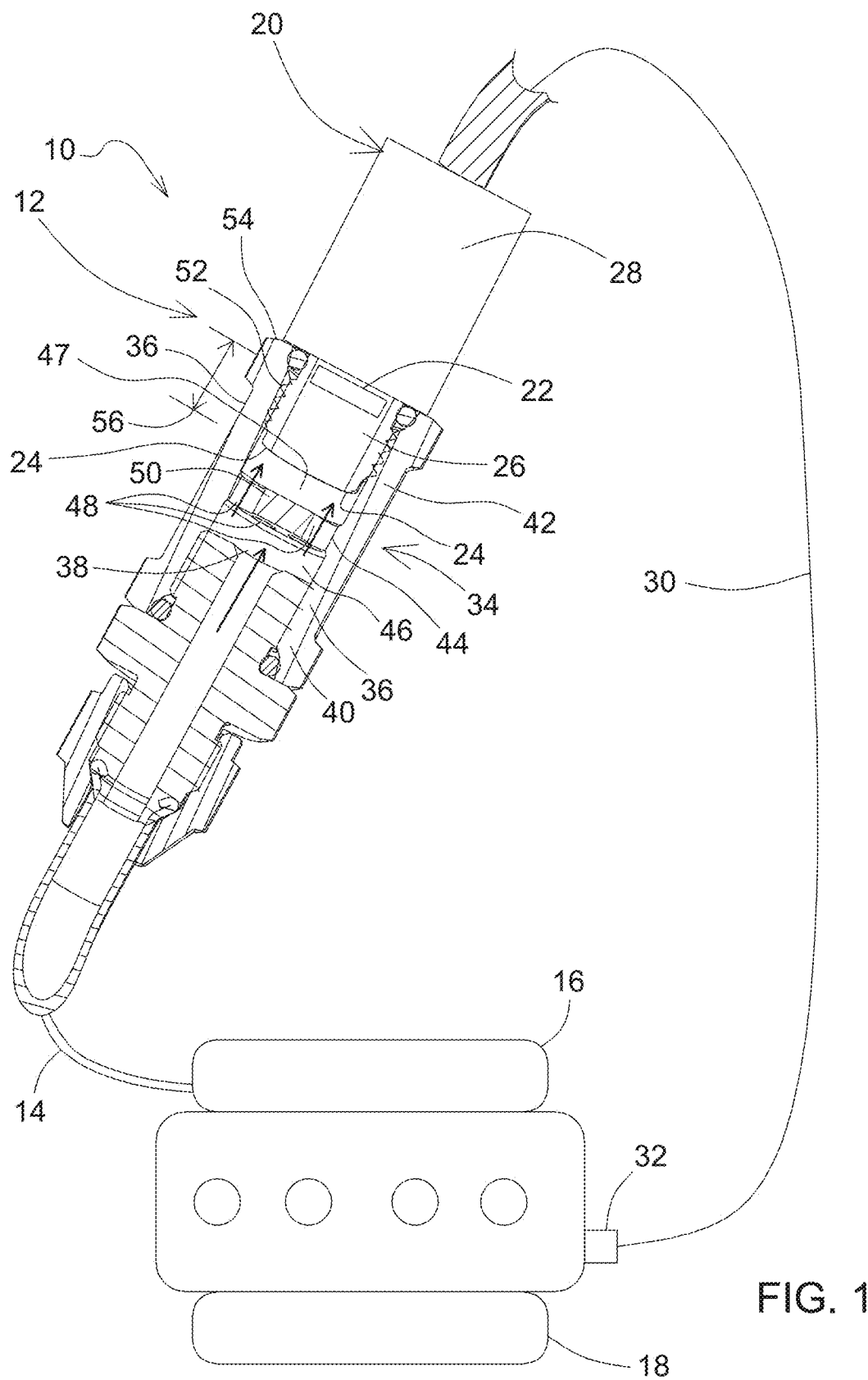
FIG. 1 illustrates an exhaust gas pressure sensor assembly in accordance with an embodiment of the present disclosure.

Referring to FIG. 1, an internal combustion engine 10 is illustrated having an exhaust gas pressure sensor assembly 12 in accordance with an embodiment of the present disclosure. The engine 10 is a diesel engine in the illustrated embodiment but may be fueled by any other fuel and/or operate under any other principle for internal combustion engine operation in additional embodiments. The assembly 12 is positioned at the end of a pressure line 14 that is in fluid communication with, accesses, or otherwise receives pressurized exhaust gas from an exhaust manifold 16 of the internal combustion engine 10. As illustrated in FIG. 1, the internal combustion engine 10 further includes an intake manifold 18.

The assembly 12 includes an exhaust gas pressure sensor 20 that senses a pressure of exhaust gas at the exhaust manifold 16. The exhaust gas pressure sensor 20 of an embodiment senses an absolute pressure of the exhaust gas. In additional embodiments, the exhaust gas pressure sensor 20 also or alternatively senses a relative pressure of the exhaust gas, such as pressure relative to atmospheric air pressure and/or intake air pressure, to name non-limiting examples. The exhaust gas pressure sensor 20 includes a diaphragm 22 that moves or deforms upon receiving, reacts to receiving, and/or otherwise receives a pressure of the exhaust gas in accordance with the operation of the exhaust gas pressure sensor 20. The diaphragm 22 is disposed radially inside of an end surface 24 of the exhaust gas pressure sensor 20 and may be located inside of an inner passageway 26. In the illustrated embodiment, the diaphragm 22 is located downstream from the end surface 24. The exhaust gas pressure sensor 20 shown in FIG. 1 includes additional circuitry 28, including additional components, circuits, and/or structures, to convert the action or receipt of pressure by the diaphragm 22 into a signal indicating a pressure of the exhaust gas at the exhaust manifold 16. The signal may be sent via a signal line 30 to an engine controller 32 and/or other device or accessory that may further process the signal and/or control the engine 10 in response to the signal.

Figure 2:
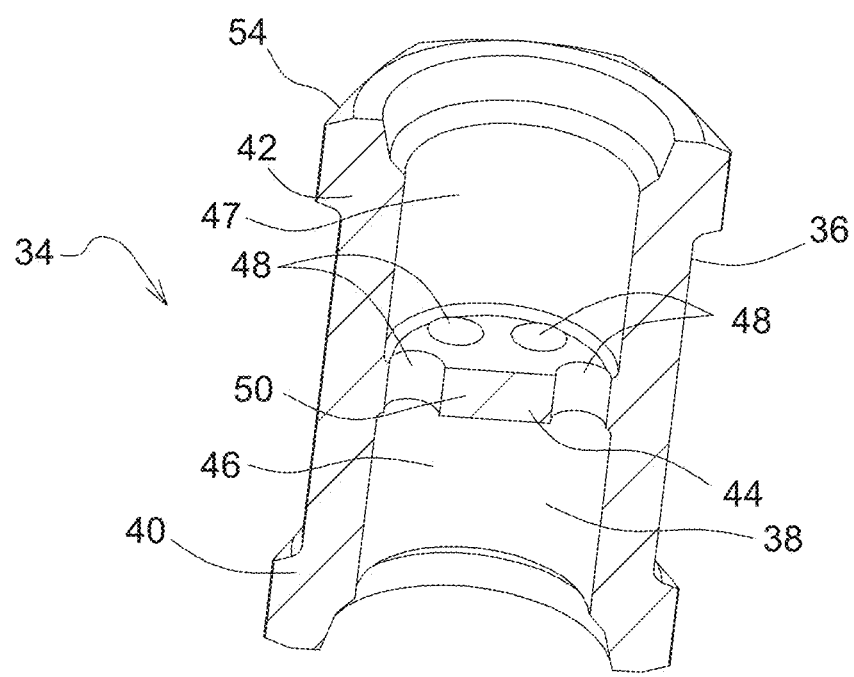
FIG. 2 is a cross-sectional view of a baffle in accordance with an embodiment of the present disclosure.

Referring now to FIG. 2 with continuing reference to FIG. 1, the assembly 12 further includes a baffle 34 disposed between the source of the exhaust gas, such as the exhaust manifold 16 in the embodiment illustrated in FIG. 1, and the exhaust gas pressure sensor 20. The baffle 34 includes a conduit 36 that encloses an exhaust gas volume 38 between the exhaust manifold 16 of the engine 10, or the pressure line 14 of the engine 10, and the exhaust gas pressure sensor 20. The conduit 36 of the embodiment illustrated in FIG. 1 includes an exhaust gas side 40 of the conduit 36 located closer to the engine 10 or source of the exhaust gas and a sensor side 42 of the conduit 36 located closer to the exhaust gas pressure sensor 20. In additional embodiments not illustrated, the conduit 36 may not include one or both of the exhaust gas side 40 and the sensor side 42 of the conduit 36 and/or may form one or both of the exhaust gas side 40 and the sensor side 42 of the conduit 36 as an integral part of the pressure line 14, the exhaust gas pressure sensor 20, and/or another part of the assembly 12.

The baffle 34 of the assembly 12 further includes a plate 44 disposed within the conduit 36. The plate 44 may separate the exhaust gas volume 38 into a first portion 46 and a second portion 47. The exhaust gas pressure sensor 20 is disposed at the second portion 47 of the exhaust gas volume 38. The plate 44 of the illustrated embodiment is spaced from the end surface 24 of the exhaust gas pressure sensor 20. Although the plate 44 is illustrated as being integral with the conduit 36 in FIGS. 1 and 2, the plate may be formed separately from the conduit 36 and/or formed integrally with the exhaust gas pressure sensor 20, the pressure line 14, and/or another part of the assembly 12 in additional embodiments not illustrated.

As illustrated in FIG. 1, the conduit 36 of the baffle 34 encircles, surrounds, covers, or encloses the end surface 24 of the exhaust gas pressure sensor 20. The conduit 36 and/or the exhaust gas pressure sensor 20 includes a coupling 52, such as a threaded portion as illustrated in FIG. 1 with threads located on both the exhaust gas pressure sensor 20 and an inside surface of the conduit 36, that couples the baffle 34 to the exhaust gas pressure sensor 20. In additional embodiments not illustrated, the coupling 52 may include one or more features or structures that weld, fasten, press-fit, or attach the baffle 34 to the exhaust gas pressure sensor 20. As shown in FIG. 1, the conduit 36 includes a conduit sensor end 54, and the conduit 36 covers or overlaps the exhaust gas pressure sensor 20 such that the end surface 24 of the exhaust gas pressure sensor 20 is spaced from the conduit sensor end 54 by a distance 56.

The baffle 34 of the assembly 12 further includes one or more apertures 48 disposed through the plate 44. The aperture(s) 48 provide fluid communication of the exhaust gas between the first portion 46 of the exhaust gas volume 38 and the second portion 47 of the exhaust gas volume 38. Each of the apertures 48 may be centered radially outside of the diaphragm 22 of the exhaust gas pressure sensor 20 in an embodiment. In the illustrated embodiment, the diaphragm 22 is located downstream from the end surface 24 such that the apertures may be centered radially outside of an area of the inner passageway 26 to, for example, deflect particles carried by pulsating flow from the exhaust manifold 16 to the diaphragm 22 of the exhaust gas pressure sensor 20. The diaphragm 22 has a diameter or area that may be larger than, smaller than, or equal to a diameter or area of the inner passageway 26.

Figure 3:
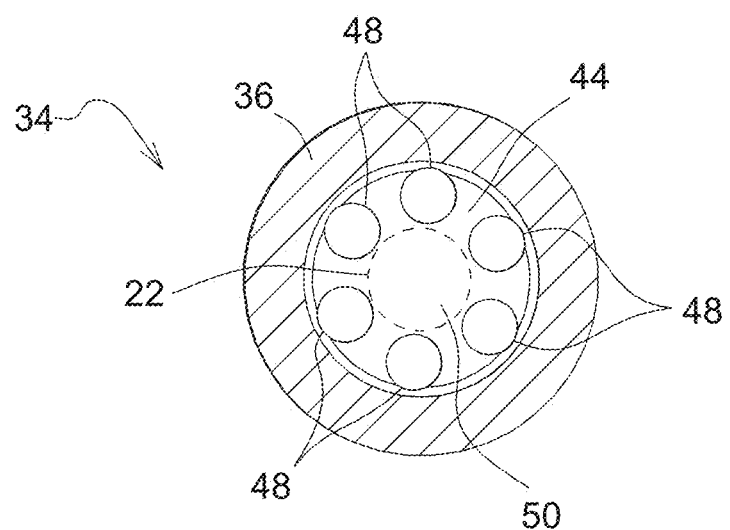
FIG. 3 is a plan view of a baffle in accordance with an embodiment of the present disclosure.

As illustrated in FIG. 3, the plate 44 includes a central portion 50 concentric with and axially spaced from the diaphragm 22 of the exhaust gas pressure sensor 20. Each of the apertures 48 is centered radially outside of the central portion 50 in the illustrated embodiment. In one or more embodiments, the aperture(s) 48 is centered radially outside of the central portion 50 such that the exhaust gas does not impinge on and/or is not fluidly communicated to or directed toward the diaphragm 22 of the exhaust gas pressure sensor 20.

The exhaust gas communicated to the second portion 47 of the exhaust gas volume 38 impinges onto or is otherwise in fluid communication toward the end surface 24 of the exhaust gas pressure sensor 20 of the exhaust gas pressure sensor assembly 12 by virtue of the position, size, and/or orientation of the aperture(s) 48. In an embodiment, the exhaust gas communicated to the second portion 47 of the exhaust gas volume 38 impinges directly onto the end surface 24 of the exhaust gas pressure sensor 20 of the exhaust gas pressure sensor assembly 12 and/or is directed toward and/or against the end surface 24 of the exhaust gas pressure sensor 20 of the exhaust gas pressure sensor assembly 12. In one or more embodiments, the central portion 50 has a central portion area that is greater than an area or diameter of the inner passageway 26 and/or a diaphragm area of the diaphragm 22.

As illustrated in FIGS. 2 and 3, multiple apertures 48 are arranged as a circular array of apertures 48 in accordance with an embodiment. In additional embodiments not illustrated, the apertures 48 may be arranged in a square, linear, or other array or arrangement. Further, in additional embodiments, one or more or all of the aperture(s) 48 of a baffle 34 may shaped to be circular, as shown, or shaped as a square, triangular, a slot, or any other one more shapes or combination thereof. Although six apertures 48 are illustrated in FIG. 3, the baffle 34 includes between one and twenty apertures 48 in an embodiment, between one and ten apertures 48 in another embodiment, between three and eight apertures 48 in another embodiment, and between four and six apertures 48 in another embodiment.

In one or more embodiments, the aperture(s) 48 has an aperture diameter that is less than that is less than one-third of a conduit diameter of the conduit 36 at the plate 44, less than one-fourth of a conduit diameter of the conduit 36 at the plate 44 in another embodiment, greater than one-tenth of a conduit diameter of the conduit 36 at the plate 44 in an embodiment, and greater than one-eighth of a conduit diameter of the conduit 36 at the plate 44 in an embodiment. In one or more embodiments, the aperture(s) 48 has an aperture area that is less than one-third of a conduit area of the conduit 36 at the plate 44, less than one-fourth of a conduit area of the conduit 36 at the plate 44 in another embodiment, greater than than one-tenth of a conduit area of the conduit 36 at the plate 44 in an embodiment, and greater than than one-eighth of a conduit area of the conduit 36 at the plate 44 in an embodiment.

Without in any way limiting the scope, interpretation, or application of the claims appearing below, a technical effect of one or more of the example embodiments disclosed herein is to improve the durability and accuracy of the exhaust gas pressure sensor 20 and the assembly 12. The number, size, positioning, orientation, and/or arrangement of the aperture(s) 48 of the baffle 34 in accordance with the embodiments described herein provide several significant technical advantages and benefits. The aperture(s) 48 are sized and numbered sufficiently, as well as positioned as shown and described, such that the pressure of the exhaust gas present in the baffle 34 and fluidly communicated to the diaphragm 22 of the exhaust gas pressure sensor 20 is consistent between the exhaust manifold 16 and the diaphragm 22 to allow the exhaust gas pressure sensor 20 to accurately sense the pressure and provide an accurate signal. Further, the aperture(s) 48 are positioned, oriented, numbered, and sized to reduce or prevent solid particles and other materials from traveling through the plate 44, toward the diaphragm 22, or otherwise being communicated to or onto the diaphragm 22, such as by pressure pulses generated by the internal combustion engine 10 through the pressure line 14. Accordingly, the assembly 12 and the baffle 34 are provided to enhance durability and accuracy of the exhaust gas pressure sensor 20 and assembly 12 and/or prevent or reduce damage, fouling, wear, and/or malfunction of the exhaust gas pressure sensor 20 as a result of such solid particles and/or other materials contacting the diaphragm 22.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A baffle of an exhaust gas pressure sensor assembly that is disposed at an exhaust manifold of an internal combustion engine and includes an exhaust gas pressure sensor configured to sense a pressure of exhaust gas at the exhaust manifold, the baffle comprising:
    a conduit having a conduit axis and being configured to enclose an exhaust gas volume between the exhaust manifold and the exhaust gas pressure sensor of the exhaust gas pressure sensor assembly;
    a plate disposed within the conduit separating the exhaust gas volume into a first portion and a second portion and spaced from an end surface of the exhaust gas pressure sensor that is disposed at the second portion of the exhaust gas volume; and
    a plurality of apertures disposed through the plate and configured to provide fluid communication of the exhaust gas between the first portion of the exhaust gas volume and the second portion of the exhaust gas volume such that each of the plurality of apertures is centered radially outside of an inner passageway to a diaphragm of the exhaust gas pressure sensor.

2. The baffle of claim 1, wherein the plate comprises a central portion concentric with and axially spaced from the diaphragm of the exhaust gas pressure sensor; and wherein each of the plurality of apertures is centered radially outside of the central portion.

3. The baffle of claim 1, wherein each of the plurality of apertures is configured such that the exhaust gas communicated to the second portion of the exhaust gas volume impinges onto the end surface of the exhaust gas sensor of the exhaust gas pressure sensor assembly.

4. The baffle of claim 1, wherein the plurality of apertures is configured as a circular array of apertures.

5. The baffle of claim 1, wherein the conduit is configured to enclose the end surface of the exhaust gas sensor.

6. The baffle of claim 1, wherein the conduit comprises a threaded portion configured to couple the baffle to the exhaust gas sensor.

7. The baffle of claim 1, wherein each of the plurality of apertures has an aperture diameter that is less than one-third of a conduit diameter of the conduit at the plate.

8. The baffle of claim 1, wherein each of the plurality of apertures has an aperture area that is greater than one-twentieth of a conduit area of the conduit at the plate.

9. An exhaust gas pressure sensor assembly configured for positioning at an exhaust manifold of an internal combustion engine to sense a pressure of exhaust gas at the exhaust manifold, the assembly comprising:
    an exhaust gas pressure sensor having an inner passageway to a diaphragm disposed radially inside of an end surface of the exhaust gas pressure sensor and configured to receive a pressure of the exhaust gas;
    a conduit configured to enclose an exhaust gas volume between the exhaust manifold and the exhaust gas pressure sensor;
    a plate disposed within the conduit and configured to separate the exhaust gas volume into a first portion and a second portion spaced from the end surface of the exhaust gas pressure sensor that is disposed at the second portion of the exhaust gas volume; and
    a plurality of apertures disposed through the plate and configured to provide fluid communication of the exhaust gas between the first portion of the exhaust gas volume and the second portion of the exhaust gas volume such that each of the plurality of apertures is centered radially outside of the inner passageway to the diaphragm of the exhaust gas pressure sensor.

10. The assembly of claim 9, wherein the plate comprises a central portion concentric with and axially spaced from the diaphragm of the exhaust gas pressure sensor; and wherein each of the plurality of apertures is centered radially outside of the central portion.

11. The assembly of claim 9, wherein the exhaust gas communicated to the second portion of the exhaust gas volume impinges onto the end surface of the exhaust gas sensor of the exhaust gas pressure sensor assembly.

12. The assembly of claim 9, wherein the plurality of apertures is configured as a circular array of apertures.

13. The assembly of claim 9, wherein the conduit is configured to enclose the end surface of the exhaust gas sensor.

14. The assembly of claim 9, wherein the conduit comprises a threaded portion coupling the baffle to the exhaust gas sensor.

15. The assembly of claim 9, wherein each of the plurality of apertures has an aperture diameter that is less than one-third of a conduit diameter of the conduit at the plate.

16. The assembly of claim 9, wherein each of the plurality of apertures has an aperture diameter that is greater than one-tenth of a conduit diameter of the conduit at the plate.

* * * * *